Jan. 17, 1967     A. AURACHER     3,298,773
EXPOSURE CONTROLS FOR MOTION PICTURE CAMERAS
Filed Sept. 17, 1964
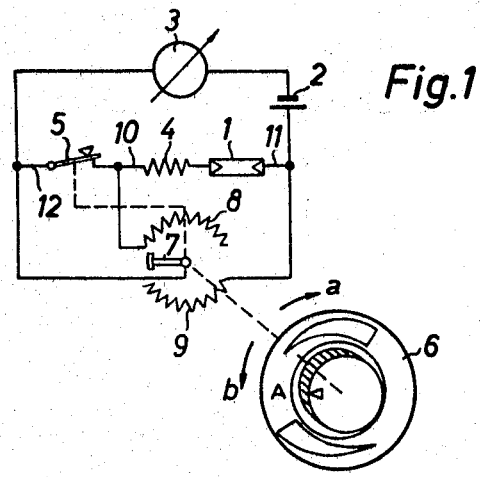
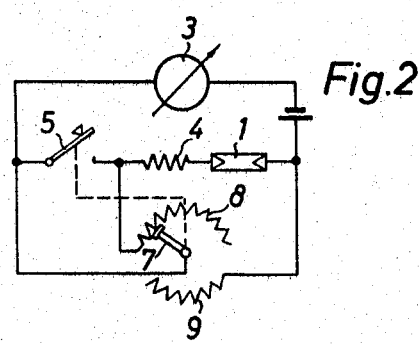
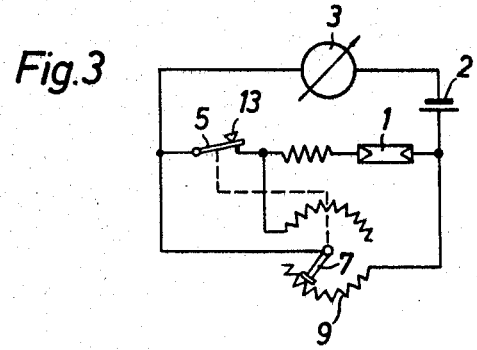
INVENTOR.
AUGUST AURACHER
BY
Michael J. Striker United States Patent Office 3,298,773
Patented Jan. 17, 1967

3,298,773
EXPOSURE CONTROLS FOR MOTION PICTURE CAMERAS
August Auracher, Unterhaching, near Munich, Germany, assignor to AGFA Aktiengesellschaft, Leverkusen, Germany
Filed Sept. 17, 1964, Ser. No. 397,168
Claims priority, application Germany, Sept. 20, 1963
A 44,099
7 Claims. (Cl. 352—141)

The present invention relates to motion picture cameras.

More particularly the present invention relates to that type of motion picture camera which has its diaphragm connected in the well known manner with a moving coil instrument to be automatically adjusted thereby in accordance with the intensity of light impinging on a photosensitive resistor connected in series with the moving coil instrument and, of course, having a suitable source of current.

Motion picture cameras of this general construction are well known. For most purposes they operate satisfactorily. However, there are conditions where it is highly desirable to be able to manually adjust the diaphragm as well as conditions where the photographer will wish to provide either an intentional overexposure of an intentional underexposure, and because of the permanent connection between the diaphragm and the moving coil instrument in conventional cameras of this type difficulties are encountered in providing these conventional cameras with the possibility of manual diaphragm adjustment or intentional overexposure or underexposure.

One of the primary objects of the present invention is to provide a motion picture camera of the above type with a simple structure enabling intentional overexposures or intentional underexposures to be made without disconnecting the moving coil instrument from its circuit.

Also, it is an object of the invention to provide a simple structure which will enable the diaphragm to be manually set without disconnecting the moving coil instrument from the circuit.

In addition, it is an object to provide an exceedingly compact and simple electrical assembly which in a very convenient manner provides the operator with four possible types of camera operation, namely, automatic setting of the diaphragm according to the intensity of the light which impinges on the photosensitive resistor, manual setting of the diaphragm, setting of the diaphragm to provide an intentional overexposure, and setting of the diaphragm to provide an intentional underexposure.

While this wide range of possible types of operation is, of course, extremely useful for trick photography, nevertheless there are also certain extreme lighting conditions which when encountered will require intentional variations from the automatic setting in order to provide proper exposures. For example, when the subject which is to be photographed is situated against a very brightly illuminated background and it is not desired to have a back lighting effect but instead it is desired to provide a proper exposure of the subject, then, of course, an intentional overexposure is called for so as to properly expose the subject which is illuminated to an extent less than the bright background. On the other hand, if the camera is held in an area where there is not very much light but is aimed at a subject which is brightly illuminated, it is clear that with the automatic setting of the camera the diaphragm will provide an aperture which is too great, so that under these conditions an intentional underexposure is called for so as to properly expose a brightly illuminated subject when the camera itself is held in an area where the light impinging on the photosensitive resistor is considerably less than the intensity of light impinging on the subject which is to be photographed. Thus, besides the possibility of achieving unusual effects by so-called trick photography, there are lighting conditions which do call for intentional variations in the automatic setting of the camera diaphragm, and with the structure of the invention it is possible in a very simple and convenient manner to operate the camera either to achieve unusual effects or so as to provide proper exposure of the film when photographing a given subject under unusual lighting condition of the type referred to above.

With the above objects in view the invention includes, in a motion picture camera, a moving coil means which is adapted to be operatively connected to the diaphragm for automatically setting the latter, and a photosensitive resistor and a source of current connected by an electrical circuit in series with each other and with the moving coil means, so that the latter will automatically set the diaphragm according to the light impinging on the photosensitive resistor. A pair of variable resistors are electrically connected to the circuit in series and in parallel therewith, respectively, and a means is available to the operator for selectively disconnecting one of the variable resistors from the circuit while adjusting the variable resistor which remains in the circuit so that by varying the circuit with the variable resistor which is in series with the circuit it is possible to provide an intentional overexposure while when the circuit is influenced by the variable resistor connected in parallel an intentional underexposure can be achieved.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a schematic diagram showing the structure of the invention and in particular the electrical circuitry, the structure being shown in FIG. 1 in the position it takes for normal automatic setting of the diaphragm according to the light impinging on the photosensitive resistor;

FIG. 2 shows the wiring digaram of FIG. 1 in the position which the parts take when the operator chooses to make an overexposure; and FIG. 3 shows the position which the parts take when the operator elects to provide an intentional under-exposure.

In the example of the structure of the invention which is illustrated in the drawings, the electrical circuit electrically interconects a photosensitive resistor 1, which is in a well known manner carried by the camera in such a way that light in front of the camera will impinge on the resistor 1, in series with a source of current 2, which can be a battery or a well known type of miniature cell. The circuit connects the photosensitive resistor 1 in series with source of current 2 as well as in series with the moving coil means 3, conventionally in the form of a galvanometer which in a well known manner is operatively connected with the diaphragm of the camera to automatically set the latter. The circuit also includes a compensating resistor 4. The moving coil means 3 may, for example, have a pin-and-slot connection with the blades of the diaphragm so as to be directly connected thereto in a known manner.

The series circuit of elements 1-4 further includes a switch 5 which, as is diagrammatically illustrated, is mechanically connected with a rotary, manually turnable knob 6 which can be turned by the operator to open or close the switch 5. For this purpose, for example, the rotary knob 6 can be connected with a suitably shaped cam against which a projection which extends from the switch 5 bears, this switch 5 being urged by a spring to its closed position, so that according to the angular position of the knob 6 the cam connected thereto can cooperate with this projection either to open the switch in opposition to the spring which urges the latter to its closed position or to release the switch to the force of the spring which will close the switch.

The rotary knob 6 is also fixed with a slider 7 of a variable resistor assembly, so that the slider 7 is constrained to turn with the knob 6, and the outer end of the slider 7 will thus turn along a circular path which defines a circle along which are situated a pair of resistors 8 and 9 which are capable of being selectively engaged by the slider 7, in accordance with angular turning of knob 6, so that in this way a pair of variable resistors are provided. The resistor 8 is electrically connected at one end of the series circuit of elements 1–5 at the portion 10 of this circuit which extends between the photosensitive resistor 1 and the switch 5. The other resistor 9 is electrically connected at one end to the series circuit at the portion 11 thereof which is connected to the end of the photosensitive resistor 1 opposite from the end thereof which is connected to the switch 5. The slider 7 itself is electrically connected with the conductor portion 12 of the series circuit, this conductor portion 12 being connected to the switch 5 at the side thereof opposite from the connection of the resistor 8 to the series circuit, so that the slider 7 and the resistor 8 are connected to the series circuit of elements 1–5 with a pair of electrical connections between which the switch 5 is situated.

In the position of the parts illustrated in FIG. 1 the current flows through the series circuit, from the source 2 through the photosensitive resistor 1 and the moving coil means 3, inasmuch as the switch 5 is closed and the slider 7 is out of engagement with the resistors 8 and 9 so that they are disconnected from the circuit. Therefore, the moving coil of the galvanometer 3 and thus the diaphragm blades take a position which is directly determined by the intensity of the light impinging on the photosensitive resistor 1.

Assuming now that the parts have the position shown in FIG. 1 and that the operator turns the knob 6 in the direction of the arrow as shown in FIG. 1, then the slider 7 will engage the resistor 8 of the variable resistor 7, 8. The mechanical transmission between the knob 6 and the switch 5 will automatically open the switch 5 when the slider 7 engages the resistor 8. Thus, the switch 5 is bridged by the variable resistor 7, 8 and the current flows not only through the photosensitive resistor 1 and the moving coil means 3, but also through a greater or lesser portion of the resistor 8, depending upon the position of the slider 7 therealong. In this way the total resistance of the circuit is increased. The circuit therefore behaves as it would if the intensity of the light impinging on the photosensitive resistor 1 were to diminish. In other words, as the intensity of the light impinging on the photosensitive resistor 1 decreases, the resistance thereof increases, and vice versa, so that the additional resistance added to the circuit by the variable resistor 7, 8 makes the moving coil means 3 behave in the same way as if the intensity of the light received by the photosensitive resistor 1 drops, and thus the moving coil means 3 will position the diaphragm blades to provide an aperature larger than actually called for by the light impinging on the photosensitive resistor 1, with the result that an overexposure will be made.

If, however, with the parts in the position shown in FIG. 1, the operator turns the knob 6 in the direction of the arrow b then the slider 7 will move along the resistor 9, while the switch 5 remains closed. Therefore, one part of the current will flow through the switch 5 and the photosensitive resistor 1, while another part of the current will flow through the slider 7 and variable resistor 9. This position, therefore, has the effect of reducing the resistance of the photosensitive resistor 1, so that it behaves in the same way as it does during an increase in the intensity of the light impinging thereon. As as result the moving coil means 3 moves the diaphragm blades to a position providing an aperture smaller than that actually called for by the intensity of the light received by the photosensitive resistor 1, and thus an underexposure will result.

It will be seen that FIG. 2 illustrates the parts in the position they take for providing an overexposure, while FIG. 3 illustrates the parts in the position they take for an underexposure.

In addition to the manually operable means formed by the knob 6 and its connections to the slider 7 and the switch 5 for operating the structure to provide over-exposures or underexposures, a second manually operable means, schematically indicated by the handle 13, in FIG. 3, is operatively connected to the switch 5 so that when the parts have the positon shown in FIG. 3 the operator may, if he so desires, manually open the switch 5 while the slider 7 engages the resistor 9. The same result could be achieved by an additional switch provided specifically for this purpose and situated in the conductor 12, although the illustrated structure is preferred since it eliminates the necessity for such an additional switch. In this case, which is to say when the parts have the position of FIG. 3 and the operator has manipulated the manually operable means 13 so as to open the switch 5, the current will flow only through the moving coil means 3 and the portion of the resistor 9 which is placed in the circuit according to the angular position of the slider 7. The photosensitive resistor 1 has been disconnected from the circuit and no current flows therethrough. Therefore, the position of the moving coil of the galvanometer 3, and thus the aperture provided by the diaphragm, will be determined solely by the adjusted position of the variable resistor 7, 9. In this way a purely manual adjustment of the diaphragm, completely uninfluenced by the surrounding light, can be achieved so as to provide any selected aperture with the diaphragm.

It is apparent that the structure of the invention has three circuit branches connected in parallel with each other, one of the branches including the source of current 2 and the moving coil means 3, the second branch including the photosensitive resistor 1 and the switch 5, and the third branch including the resistor 9 and the slider 7. When this third branch is opened by displacing the slider 7 beyond the resistor 9, the diaphragm will be set only according to the light received by the photosensitive resistor 1, while when the second branch is opened by opening the switch 5 the purely manual setting of the diaphragm can be achieved by cooperation of the slider 7 with the resistor 9. Actually the source of current 2 and moving coil means 3 are connected into a series circuit whose ends are respectively connected to the slider 7 and resistor 9 so that when these elements engage each other the series circuit will be closed, and the second series circuit which includes the photosensitive resistor 1 and the switch 5 has its ends respectively connected to this first series circuit between the ends thereof and the source of current 2 on the one hand, and the moving coil means 3 on the other hand.

It will be understood that each of the elements described above, or two or more together, may also find a useful application in other types of cameras differing from the types described above.

While the invention has been illustrated and described as embodied in exposure controls for cameras, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a motion picture camera, in combination, moving coil means adapted to be connected with a diaphragm of the camera for adjusting the diaphragm; a source of current; a photosensitive resistor adapted to receive light; a switch; an electrical circuit connecting said source of current, said photosensitive resistor, and said switch in series with each other and with said moving coil means; a first variable resistor including a resistor and slider movable therealong, said resistor and slider being electrically connected with said circuit at a pair of connections between which said switch is situated; manually operable means operatively connected to said slider for moving the latter along said resistor of said variable resistor and for moving said slider along a predetermined path situated beyond said resistor of said variable resistor, said manually operable means also being connected to said switch for opening the latter when said slider engages said resistor of said variable resistor so that the latter will then be connected in series with said circuit to provide an over-exposure and for closing said switch when said slider is situated along said path beyond said resistor of said variable resistor so that said moving coil means will then be influenced only by the light impinging on said photosensitive resistor; and a second resistor connected at one end to said circuit and situated along said path along which said slider is moved by said manually operable means when said slider is situated beyond said resistor of said variable resistor to be engaged by said slider while said switch remains closed so as to form with said slider a second variable resistor connected in parallel with said circuit to provide an underexposure, whereby upon manipulation of said manually operable means the operator can selectively provide an intentional overexposure, an intentional underexposure, or a diaphragm setting according to the light which impinges on said photosensitive resistor.

2. In a camera as recited in claim 1, said path of movement of said slider being circular and said second resistor and said resistor of said first mentioned variable resistor being spaced from each other and located along a circle which includes said circular path of movement of said slider.

3. In a camera as recited in claim 2, said manually operable means including a rotary knob accessible to the operator.

4. In a motion picture camera, in combination, moving coil means adapted to be connected with a diaphragm of the camera for automatically adjusting the diaphragm; a source of current; a variable resistor including a resistor and a slider movable therealong; a first electrical circuit connecting said moving coil means and said source of current in series and having a pair of ends respectively connected to said slider and resistor so that when said slider engages said resistor said first circuit is closed and the diaphragm can be adjusted by movement of said slider along said resistor while when said slider is situated beyond said resistor said first electrical circuit is open; a photosensitive resistor; a switch; a second electrical circuit connecting said photosensitive resistor and switch in series with each other and having a pair of ends respectively connected electrically with said first circuit between the ends thereof and said source of current, on the one hand, and said moving coil means, on the other hand, so that said electrical circuits cooperate to provide a parallel circuit having three branches one of which includes said variable resistor, the second of which includes said source of current and moving coil means, and the third of which includes said photosensitive resistor and switch; first manually operable means operatively connected to said slider for moving the latter along said resistor of said variable resistor as well as beyond the latter resistor; and second manually operable means operatively connected to said switch for opening and closing the same, whereby when said second manually operable means is manipulated to open said switch and said first manually operable means moves said slider along said resistor of said variable resistor the diaphragm can be manually adjusted, when said first manually operable means displaces said slider beyond said resistor of said variable resistor and said second manually operable means closes said switch the diaphragm will be automatically adjusted according to the light impinging on said photosensitive resistor, while when said second manually operable means is manipulated to close said switch and said first manually operable means is manipulated to move said slider along said resistor of said variable resistor, the latter may be adjusted to provide an intentional underexposure.

5. In a motion picture camera as recited in claim 4, an additional resistor electrically connected at one end to said second circuit between said switch and photosensitive resistor, and said additional resistor being situated along the path of movement of said slider when the latter is situated beyond said resistor of said variable resistor so that said slider can be moved into engagement with said additional resistor to form an additional variable resistor therewith to provide intentional overexposure when said second manually operable means is manipulated to open said switch.

6. In a motion picture camera as recited in claim 5, said first manually operable means also being connected with said switch for automatically opening the latter when said slider engages said additional resistor.

7. In a motion picture camera, in combination, moving coil means adapted to be connected with a diaphragm of the camera for adjusting the diaphragm; an electrical circuit electrically connecting a photosensitive resistor and a source of current to said moving coil instrument for actuating the latter according to the intensity of light impinging on said resistor; a pair of variable resistors respectively connected in series and in parallel with said circuit for respectively providing an overexposure and an underexposure; and single manually operable means operatively connected with both of said resistors for optionally connecting a selected one of said variable resistors into said circuit while simultaneously disconnecting the other of said variable resistors from said circuit, so that the operator can provide intentionally either an overexposure or an underexposure.

References Cited by the Examiner

UNITED STATES PATENTS

| 2,573,729 | 11/1951 | Rath | 95—64 |
| 3,077,153 | 2/1963 | Gopfert | 95—10 X |
| 3,165,989 | 1/1965 | Kiper | 95—64 X |

FOREIGN PATENTS

| 1,253,935 | 1/1961 | France. |
| 367,045 | 3/1963 | Switzerland. |

NORTON ANSHER, *Primary Examiner.*

VANCE A. SMITH, *Assistant Examiner.*